United States Patent
Mullany et al.

(10) Patent No.: US 7,400,600 B2
(45) Date of Patent: Jul. 15, 2008

(54) METHOD OF TRANSPORT PROVISION FOR A SERVICE TO A USER

(75) Inventors: Francis Joseph Mullany, Swindon (GB); Louis Gwyn Samuel, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 1018 days.

(21) Appl. No.: 10/609,746

(22) Filed: Jun. 30, 2003

(65) Prior Publication Data
US 2004/0267931 A1    Dec. 30, 2004

(51) Int. Cl.
*H04Q 7/00* (2006.01)
(52) U.S. Cl. .............. 370/331; 370/329; 455/436; 455/437
(58) Field of Classification Search .............. None
See application file for complete search history.

(56) References Cited

U.S. PATENT DOCUMENTS

| | | | |
|---|---|---|---|
| 7,161,914 B2* | 1/2007 | Shoaib et al. | 370/331 |
| 2003/0074443 A1* | 4/2003 | Melaku et al. | 709/224 |
| 2003/0112766 A1* | 6/2003 | Riedel et al. | 370/252 |
| 2003/0163558 A1* | 8/2003 | Cao et al. | 709/223 |
| 2004/0192309 A1* | 9/2004 | Watanabe et al. | 455/439 |

FOREIGN PATENT DOCUMENTS

EP    1 229 751    7/2002

OTHER PUBLICATIONS

European Search Report.
Draft—"The Book of Visions 2001", *Visions of the Wireless World*, (Dec. 2001).
3GPP TR 25.922 V3.7.0, "3rd Generation Partnership Project; Technical Specification Group Radio Access Network; Radio resource management strategies", (Release 1999), (Mar. 2002).
Laurissa Tokarchuk, et al, "Agent Specification (D07) & Final Report on Resource Allocation (D11)", *Shuffle 11014*, (Dec. 2000).
Reid G. Smith, The Contract Net Protocol: High-Level Communication and Control in a Distributed Problem Solver, pp. 357-366.

* cited by examiner

*Primary Examiner*—Wing F. Chan
*Assistant Examiner*—Robert C Scheibel

(57) ABSTRACT

A telecommunications system includes a plurality of networks. At least one of the networks is a network for wireless telecommunications. Each network comprises a network controller, and the system also comprises a user controller. The user controller negotiates with the network controllers for of transport for a service to the user. The user controller agrees to contracts for transport with at least two networks, in respect to each of which the probability of providing transport is less than one.

32 Claims, 4 Drawing Sheets

METHOD OF TRANSPORT PROVISION FOR A SERVICE TO A USER

FIELD OF THE INVENTION

The present invention relates to a telecommunications, and more particularly, wireless communicationsr.

DESCRIPTION OF THE RELATED ART

The complexity of wireless systems may increase dramatically in coming years. For example, a user who has access to a range of terminals (e.g. handset, personal digital assistant (PDA), laptop, etc.), may like a particular service to be presented via any of the terminals in his/her possession. Also, there may be multiple options as to networks to carry the services requested. This choice can be between different networks offering the same type of air interface or between networks providing data transport over different technologies, depending on the interfaces available to the user. Furthermore, diverse services (beyond the basic transport of data across a network) may be offered by a multitude of service providers, independent of the network providers (e.g., Japanese "iMode" offering illustrates a diverse "digital marketplace" of services).

Thus, there may be a large number of entities with competing and/or complementary interests in the struggle to give service delivery. Accordingly, the traditional model of a user with a single terminal, subscribing to a single business entity providing both the service and the data transport for that service, may be becoming increasingly obsolete.

Multi-agent architectures have been suggested as a means for managing efficiently the complexity inherent in emerging wireless communication systems. Multi-agent architectures may be a form of distributed computing where distributed autonomous software entities interact with each other and their environment to solve problems that individually they cannot tackle. Multi-agent architectures demonstrate a number of useful properties:

(i) Autonomy. The autonomous nature of individual agents means that different agents can represent the different business players in the system: individual service providers, network providers, and users. Autonomy of the individual components also increases system robustness and scalability.

(ii) Ability to be distributed. By placing agents near to the environments with which they interact, local information can remain local. This reduces the amount of signalling across the network and again enhances the scalability of the system. Further, responses (by the lower layers of agents) to changes in the environment can be quick.

(iii) Flexibility in interaction. Agents can choose which agents to interact with—for example agents associated with a user could approach a number of service providers for a given service. Again this increases the system robustness.

(iv) Adaptability and learning. More sophisticated agents can adjust their behaviours to achieve given goals, depending on both current and past environmental conditions and on responses of other agents. Adaptability is important in wireless communications networks where the load on a given air interface and the QoS on a given link can vary greatly.

FIG. 1 shows an agent architecture that has been proposed as a means to manage complex mobile communications systems. Each end-user has a user agent ("UA") to act on his/her behalf. Each service provider has at least one service provider negotiation agent ("SPNA") acting on its behalf. Each network provider has at least one network provider negotiation agent ("NPNA"), representing the interests of the network provider in negotiation with outside agents.

The UA negotiates with the SPNA for the provision of a service that the user desires. The UA may contact more than one SPNA, so as to obtain the best service conditions at the lowest cost. Based on the requested service and information regarding the user (e.g., terminal capabilities, user location, available air interfaces, etc.), the service provider negotiation agents (SPNAs) can negotiate with one or more network provider negotiation agents (NPNAs) for the provision of data transport to carry the service under consideration. The NPNA will consult with the radio resource management entities in its own network to decide whether or not the resources may be available and at what price they could be offered to the SPNAs.

Hence, there may be two possible sets of negotiations—inter-UA-SPNA and inter-SPNA-NPNA. Either or both of these is implemented using a protocol, such as the Contract Net Protocol. FIG. 2 shows an example of an inter-SPNA-NPNA negotiation using a variant of the Contract Net Protocol. Here, the interaction between the UE and the sole SPNA given is may be a simple service request/response type of interaction. Upon receiving a service request from UA, SPNA determines the data transport requirements—e.g., quality-of-service ("QoS") requirements—and puts out the requirements to tender among the suitable NPNAs—e.g., those which may be compatible with the terminals and air interfaces supported by the user's terminal equipment. The NPNAs checks to see if the resources required to support the user may be available and on the basis of the results of those checks, they will respond with the QoS levels that they can support and the price they wish to charge for access to those resources. According to some criteria (e.g., price), the SPNA may then pick one of the bids and sends an acceptance message to the associated single NPNA. The SPNA then informs the UA which of the networks has been chosen. The tender/bid method for negotiation results in a "contract" between the SPNA and the NPNA. Hence, the outcome is suitable for expression in the form of a service level agreement—e.g., an expression of the business arrangement between the two parties.

The multi-agent architecture approach may be a general means of matching services, data transport and price, to user needs through a system of distributed agents that allows for different business actors, robustness to failure and changing user requirements and network conditions.

One aspect of the increasing complexity of wireless systems is the choice of air interface provider.

Taking a user perspective, most user applications may be sensitive to the QoS that can be delivered to the terminal. If only one air interface is available, then handover (e.g., intra-system handover and/or handover between base stations) occurs within that network to maintain the QoS of the link. With more than one air interface available—e.g., wireless local area network (WLAN), Universal Mobile Telecommunications System (UMTS), Global System for Mobiles (GSM), CDMA2000—the terminals accessible by the user may continually probe the wireless networks at their disposal in order to maintain an optimal performance of the application—e.g., service, in which case handover from one air interface to another may occur. Dynamically switching between two air interfaces during a service session is called intersystem handover. Handover is also known as handoff.

To give a specific example of what causes such variability in QoS, consider the two primary measures of the capability of an air interface, namely (a) the extent of the coverage provided, both in terms of the physical area and the range of terminal mobility (i.e. how fast the user is moving) over which the air interface connection can be maintained, and (b) the capacity provided, both in terms of the bit rate available to an individual user and the number of users the air interface can support.

It is known that there is a trade-off between capacity and coverage: systems such as WLAN with relatively high capacity levels cannot handle fast-moving users and generally have limited range, whereas cellular systems provide wide-area coverage for fast-moving users, but may be more limited in the data rates provided. It is known that if the user can access both types of air interface then he/she can maximise the given data rate for a given position and mobility level by choosing the correct air interface.

As regards intersystem handovers, a range of methods for implementing these may be known. At one end of the spectrum one has "loosely coupled" methods, where there is no interaction between the two radio access networks and the handover is managed at the inter-core-network level. A good example of this would be handover between WLAN and a cellular system implemented using Mobile Internet Protocol (Mobile IP). A method like Mobile IP is an extension of the network layers and as such requires no additional changes to the standards defining the radio access networks and hence is relatively simple to implement. However, because there is no meaningful interaction with the radio access networks, the handover is slow (in the order of hundreds of milliseconds to seconds—resulting in some temporary interruption to service, although the session is maintained.

At the other end of the spectrum, there may be "closely coupled" methods, where there is much interaction between the radio access networks of the two network providers. A good example of this may be the facilities built into a UMTS terrestrial access network (UTRAN) as discussed in Third Generation Partnership Project Standards for UMTS for what may be termed inter-RAT (radio access technology) handovers to GSM. For example, the radio resource control in the UTRAN can request a dual-mode mobile terminal to make measurements of the strength of the local GSM networks to determine whether or not a handover should be forced. Thus, seamless handover is more feasible, but the facility must be designed into the radio access network from the start—increasing complexity and requiring support in the standards.

SUMMARY OF THE INVENTION

An intersystem handover has been recognized as desirable to optimise overall data rate where the user location or mobility level has changed by an appropriate amount and could be undertaken so as to minimise the user-perceived impact on an on-going service. To achieve this, particularly since intersystem handover may occur frequently, improved system management may be required. The improved system management may be useful in some embodiments even regardless of intersystem handover.

In one example of the present invention, a telecommunications system comprises a plurality of networks. At least one of the networks may be a network for wireless telecommunications. Each network may comprise a network controller, and the system may also comprise a user controller. The user controller may negotiate with the network controllers for provision of transport for a service to the user. The user controller may agree to contracts for transport with at least two networks, with respect to each of which the probability of providing transport is less than one.

In nother embodiments, the present invention may allow for setting up of contracts in advance with multiple network providers, differentiation between the simultaneous contracts, classifying the contracts by the probability of a transport occurring over the associated network.

In other embodiments, such "probabilistic" contracts may enable radio resource management to make resource reservations to be more certain of future connectivity at a time later than the contract negotiation. Choice of network(s) can be considered as part of the business relationships between the network providers and the service provider and/or between the user and the network providers themselves. This results in a more flexible "wireless services" marketplace.

By negotiating in advance of actual intersystem handover, one or more "fall-back" networks for possible intersystem handover—e.g., at start of a session call—the agent architecture may not have to be redesigned for the different possible mechanisms of intersystem handover. Because probabilistic reservations exist in advance of the actual resources of a fall-back network being called on, there may be a lower probability of a service call being dropped during an intersystem handover. Also, the negotiations can take considerably longer than an intersystem handover should without affecting performance. Furthermore, the level of traffic generated by the up-front inter-agent negotiations may be less than with known approaches of inter-agent renegotiation or subcontracting upon intersystem handover.

BRIEF DESCRIPTION OF THE DRAWINGS

The present invention will be better understood from reading the following description of non-limiting embodiments, with reference to the attached drawings, wherein below.

Figure 1:
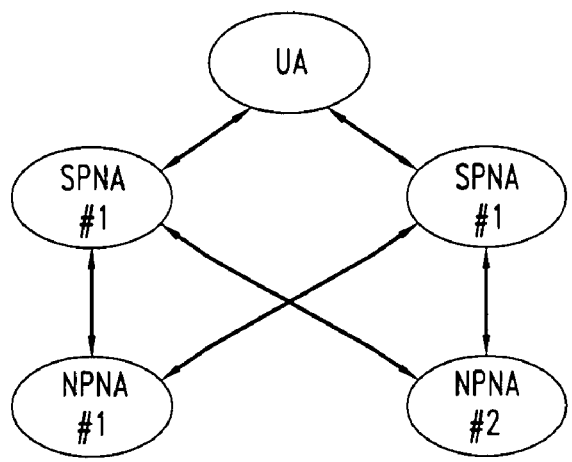
FIG. 1 is a diagram illustrating a known agent architecture.
Figure 2:
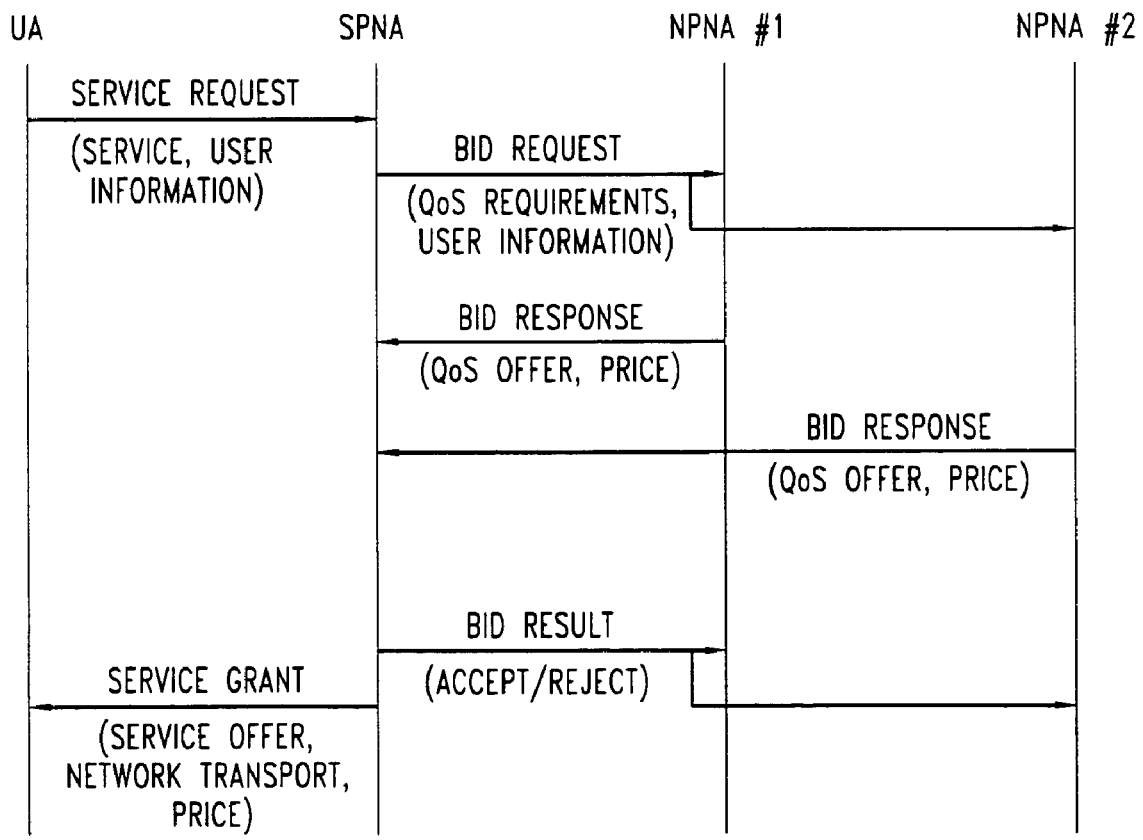
FIG. 2 is a diagram illustrating an embodiment of the present invention.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

A fundamental problem exists with the known approaches of trying to accommodate intersystem handover in an agent-based architecture based on negotiated "contracts" between network providers and either service providers (as given in the example above) or alternatively with end users. This problem is that intersystem handover requires a change in the network provider mid-session, thus resulting in the abnormal termination of previous contracts with the original network provider. Network provider negotiation agents (NPNAs) may be generally centralised within a network and hence cannot react quickly to changes in the radio resources at the edge of a network. Therefore, one approach of renegotiation of the contracts between, for example, the NPNAs and a service provider negotiation agent (SPNA), results in service interruptions and possibly the loss of the entire session. An alternative method of one NPNA sub-contracting the data transport provision to another NPNA of another network, to which the user will handover, has similar difficulties and is difficult to facilitate where the quality of service available from the second network contravenes the requirements of the original contract.

Since changing the contracted set of relationships due to changes in the choice of interfaces during a service call results in difficulties, a solution may be to phrase the initial contracts in a manner such that intersystem handover can be accommodated within the framework of the initial contract. Hence, the initial contract should explicitly allow for changes to the air interface, with all the resulting implications for billing and quality of service (QoS). The negotiation thus aims to establish transport rights across multiple air interfaces, probably with different network providers, for the one service.

This required changes in how the negotiations may be conducted. Instead of a network provider knowing that it should provide resources for a bearer that may be carried across its network, a number of network providers supporting the one service may result with a probability less than one that that service will be on any given air interface. Apart from the uncertainty that results in the revenue for the network provider, there may now be uncertainty in level of resources that has to be reserved. One simple approach for easing this problem is may be to categorise the chosen air interfaces by the probability that the service may end up on that air interface during the duration of the service. So one could have two categories:

Primary air interface. Here the probability of use may be high. The network provider probably needs to reserve the required resource allocations for the specific user. In addition to charges for the data actually carried on the air interface, the network provider could possibly also make a small charge for the reservation.

Secondary air interface. Here the probability of use may be low. The network provider makes a partial reservation— e.g., a number of users with "secondary" status may be allocated the same resource on the grounds that not all will handover into this air interface. Again, the network provider could charge for the partial reservation.

It is up to the network provider negotiation agent s (NPNAs) to "bid" for the primary and secondary air interface positions in the contract with the service provider negotiation agent (SPNA) for a given user agent (UA). This can be either a purely competitive scenario or some form of partially collaborative scenario. In the former, competitive case, the network providers decide what to bid for, independently of each other; while in the latter "partial-collaboration" case, NPNAs could team up with each other to provide joint bids.

System Architecture and Negotiation Process

Figure 3:
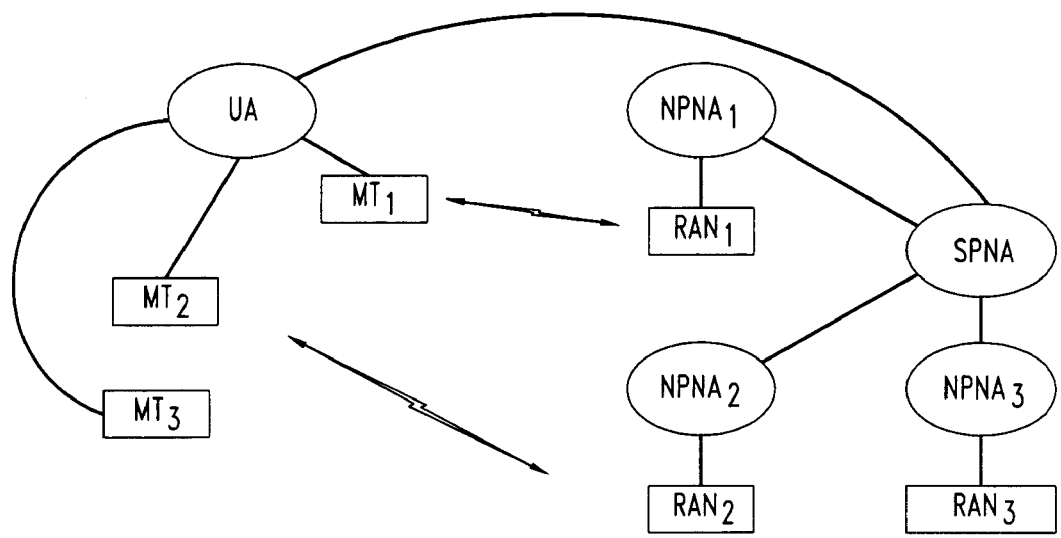
FIG. 3 is a diagram illustrating another embodiment of the present invention.

The basic system architecture is shown in FIG. 3. User agent (UA) controls mobile terminal equipment. Network provider negotiation agents (NPNAs) control their respective radio access networks (RANs). A service provider negotiation agent (SPNA) negotiates between the UA and NPNAs as to service provision. The UA can reside in one of the mobile terminal equipments (MTs), else somewhere in the networks.

An NPNA and its associated RAN belong to one service provider.

As mentioned previously (and illustrated in FIG. 1), the UA negotiates with the service provider negotiation agents (SPNA) for the provision of a service that the user desires. The UA may contact more than one SPNA, so as to obtain the best service conditions at the lowest cost. Based on the requested service and information regarding the user (terminal capabilities, user location, available air interfaces, etc.), the SPNAs can negotiate with one or more NPNAs for the provision of data transport to carry the service under consideration. The NPNA will consult with the radio resource management entities in its own network to decide whether or not the resources may be available and at what price they could be offered to the SPNAs.

Hence, there may be two sets of negotiation: inter-UA-SPNA and inter-SPNA-NPNA. In this embodiment, both of these may be implemented using Contract Net Protocol.

An exemplary scenario is shown in FIG. 3, where a negotiation result can be that a first radio access network RAN1 provides the primary air interface to the mobile terminal MT1 and a second radio access network RAN2 provides the secondary air interface to a mobile terminal MT2, both terminals being controlled by the user agent (UA). RAN3 is not used as its controlling NPNA3 was unsuccessful in the negotiation.

Figure 4:
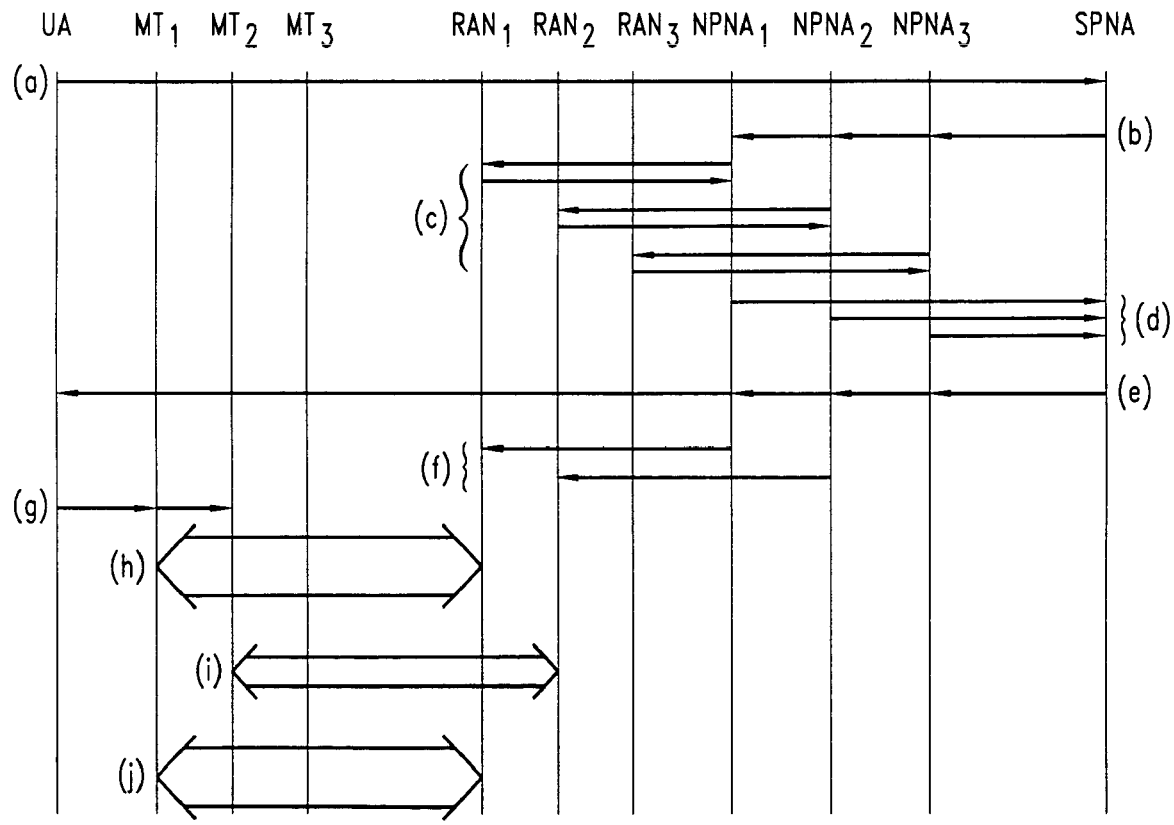
FIG. 4 is a diagram illustrating yet another embodiment of the present invention.

An exemplary process of negotiation as to primary and secondary air interfaces, then handover between the two, is shown in FIG. 4. In FIG. 4, the first of all the UA makes a communication request to the SPNA (step a). The SPNA may then put out to tender the transport requirements to the NPNAs (step b). The NPNAs may then communicate with their RANs to determine the radio resource cost of providing that transport (step c). The NPNAs may then provide their bids as to primary and secondary positions back to the SPNA (step d). The SPNA then informs the NPNAs and the UA regarding what bids may be successful (step e). The successful NPNAs then command their RANs to make the appropriate resource reservations (step f). The UA may then configures both MT1 and MT2, but commands MT1 to establish the transport link (step g). Over a period of time, the service may be carried over the air interface between MT1 and RAN1 (step h). If required, due to the user carrying MT1 moving out of range of RAN1, for example, intersystem handover from RAN1 to RAN2 occurs (step i). At a later stage, if MT1 may be back in range of RAN1, for example, intersystem handover back to RAN1 occurs (step j).

As mentioned previously, other reasons for intersystem handover besides loss of network coverage could be to optimise data rate to the user (e.g., maintain quality of service). This could be, for example, to better handle fast moving users (by handing over to a cellular network) or slow users (by handing over to a WLAN network). Another reason could be to relieve loading on a particular network.

It is the radio resources that may be negotiated which the mobile requires to provide transport for the service. Where a mobile is indoors, it is likely that a network provider with a WLAN will know that the required resources may be low and hence may bid to be the provider of the primary air interface with a competitive price. A cellular network, on the other hand, would may bid competitively for providing a secondary air interface, but may be uncompetitive for the primary. However, this could change, depending on the relative network loadings and the speed of the mobile terminal. In the purely competitive scenario, the SPNA may not inform the NPNAs as to the list of air interfaces that the mobile "sees" and has registered with so the NPNAs may not cooperate with each other. As an alternative, if the NPNAs have a more complete picture of what the UA sees in terms of available resources then they may collaborate with each other in their negotiations with the SPNA and hence may come to a more optimal solution.

As an extension to this basic approach, additional information such as the location of the user, the terminal capabilities, and even past behaviour of the user (e.g., if a user appears in a particular hot-spot, does past history suggest that the user will remain there for significant periods of time, etc.) may be used by network provider negotiation agents (NPNAs) in estimating the probability that that network may have to support the transport with that user.

In some additional embodiments, the service provider negotiation agent (SPNA) might request more than two air interface candidates—one could envisage a range of candidates with each with a different probability of being selected.

In some other embodiments, one might have an open bidding procedure where each NPNA makes an offer. Referring back to FIG. 4, step d, instead of bidding to provide primary and secondary air interfaces each having a predetermined associated probability of being taken up, in this alternative approach, the NPNAs indicate (a) the probability that the associated network will be able to serve the given user and (b) under what conditions of location and mobility is that probability calculated. It is then up to the SPNA to put together a set of network providers such that the aggregation will, with high probability (and reasonable price), be able to serve the user.

Normally, in most embodiments, the negotiations as shown for example in steps a to g of FIG. 4 may be done at service start-up; however in some systems there may be situations where it would be advantageous to re-enter the negotiation phase so as to re-negotiate the "contract." Possible reasons for this would be where the mobile recognises and registers with a new air interface during the service call or where the SPNA becomes aware of another network that is generally making more competitive offers or providing better service. However, it would still be the case that such negotiations need to be complete long before any handover to the network provider associated with that newly identified air interface.

The approach of probabilistic resource reservations and simultaneous contracts with different network providers can be applied to service-negotiation architectures other than agent-based architectures or to other agent-based architectures not based on the Contract Net Protocol. For example, negotiation can be between software entities, which may be not distributed and not autonomous. What is important is the formation of an agreement between the network provider and (ultimately) the user.

Figure 5:
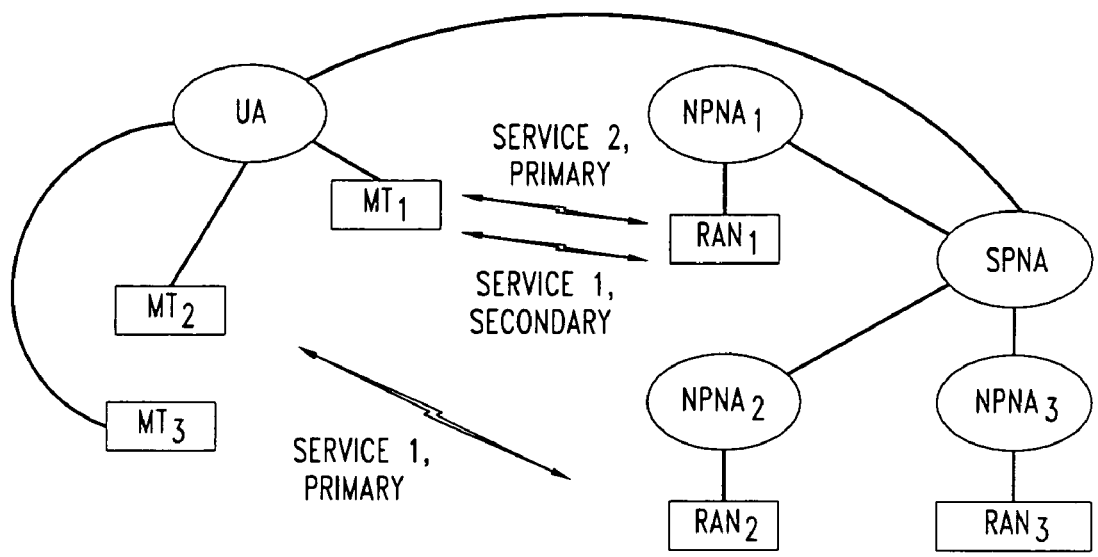
FIG. 5 is a diagram illustrating still another embodiment of the present invention.

The approach can be extended to scenarios where the user needs simultaneous access to more than one service. For example, referring to FIG. 5, a user can have a primary application—e.g., service shown as service 1 in FIG. 5—which requests a primary air interface and a secondary air interface, while in the background the user has a secondary application (service 2) which requests another primary air interface, but with a lower set of priorities. These two applications could then collaborate or be controlled by a higher entity such as a user agent (as it is in the user's interests to do so) to maintain the QoS of the highest priority application. For example, in the scenario shown in FIG. 5 when service 1 can no longer continue on the primary interface, it hands over to the secondary interface using resources that were previously assigned to service 2. This may be controlled by the user agent (UA). Here, the initial negotiation (or renegotiations on adding a new service) would account for the above possibilities, by the service provider negotiation agent SNPA requesting bids from the network provider negotiation agents (NPNAs) for transport for two (or more) applications associated with one user. An NPNA could undertake to support only one (or a subset) of the applications.

Figure 6:
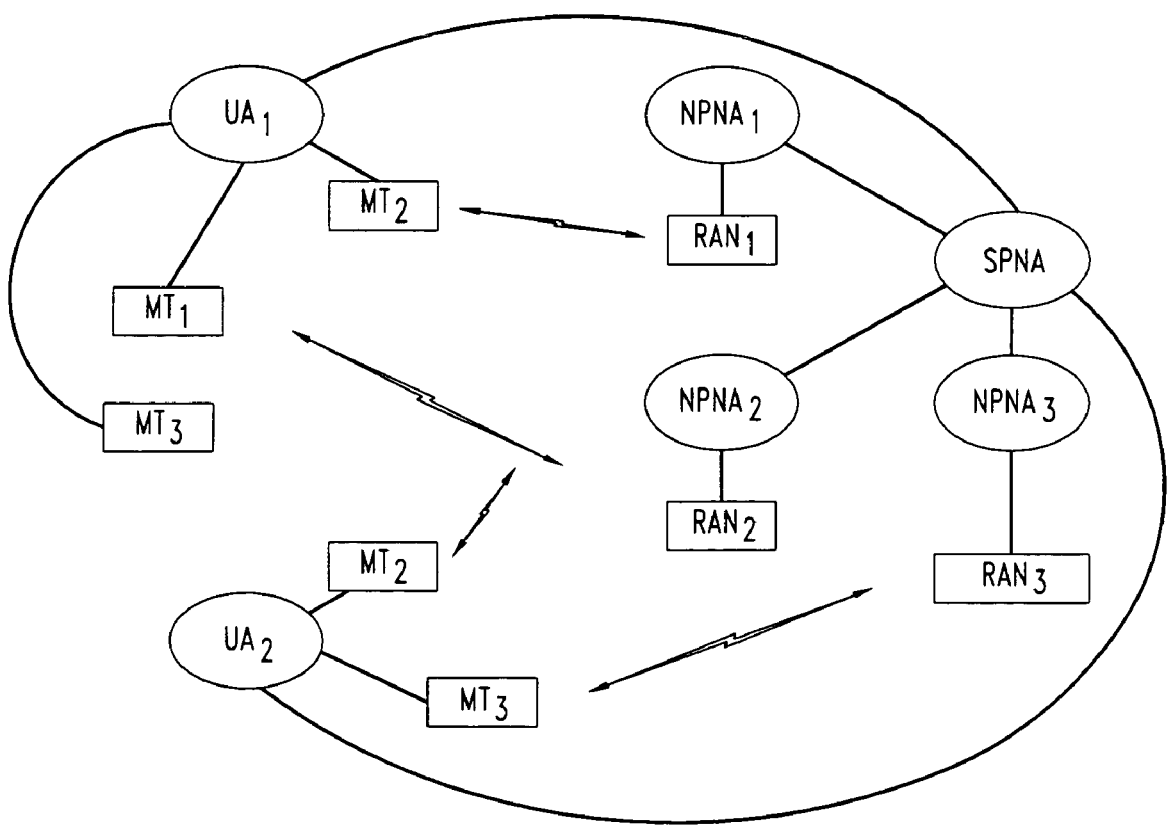
FIG. 6 is a diagram illustrating still another embodiment of the present invention.

One can take the idea mentioned in the previous paragraph of a bid request from an SPNA for a set of applications (e.g., services) one step further, namely to extend to a bid request for a set of users, as shown in FIG. 6 (e.g., MT1, MT2, MT3 denoting, of course, different types of mobile terminal equipment). This could occur where the SPNA has "block bookings" of resources with NPNAs (e.g., as would be applicable, for example, where the SPNA represents a mobile virtual network operator): the mixture of resources accepted by the SPNA (on the basis of bids from the NPNAs) could be chosen by the SPNA so that they may be optimal for the group of currently active users and their relative priorities. The users form a user group with a "community" interest in either maximising the resources across the community or for particular users in that community. So, here the NPNAs receive a request for bids for transport for a number of services and they may be free to bid for all or a subset of those services.

It will thus be seen from the previous two paragraphs that the concept of a "community" between different applications (i.e. services) of one user or between different users in a user group giving rise to number of contracts, each between one particular network provider and that "community", and the resources in those contracts may be subsequently managed as a whole to satisfy the priorities of that "community".

Another extension is to supporting a service across multiple air interfaces simultaneously (.e.g., multiple radio access networks (RANs) simultaneously). This would be particularly useful for resource intensive applications or where no one air interface can provide all the transport.

Figure 7:
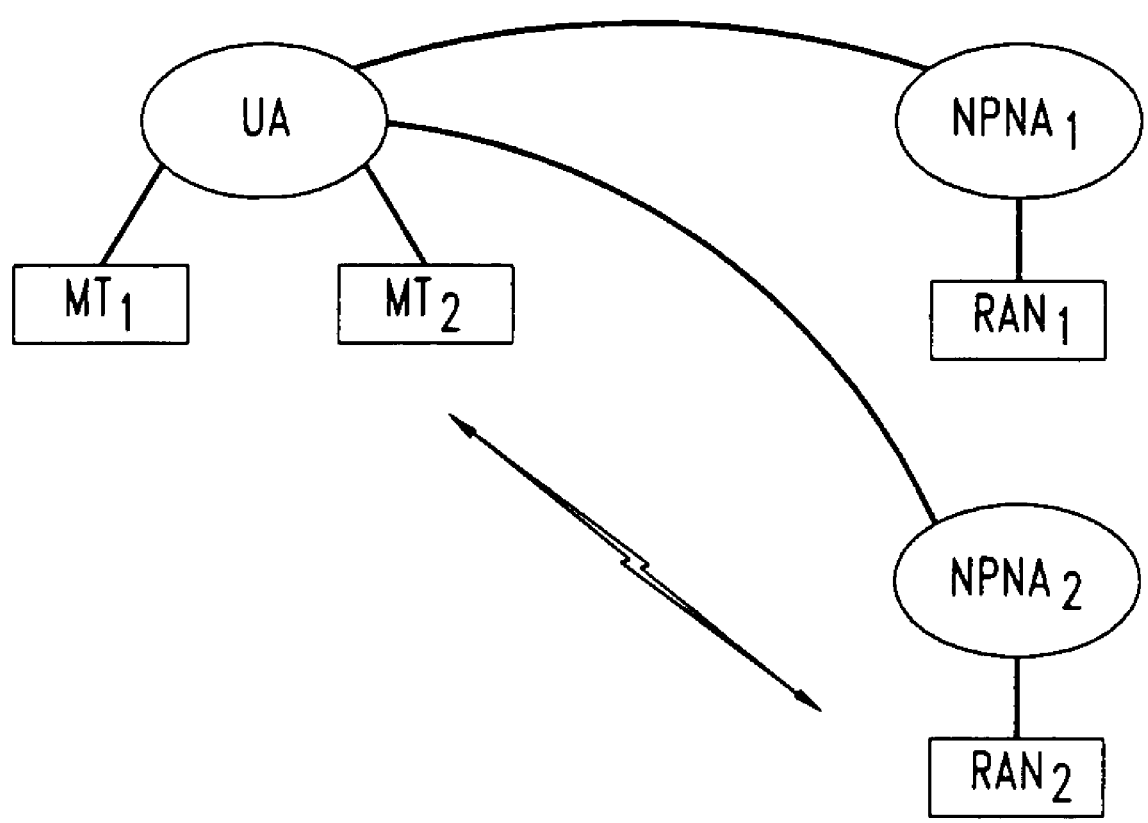
FIG. 7 is a diagram illustrating still another embodiment of the present invention.

In an embodiment shown in FIG. 7, the functionality of the SPNA described in relation to the embodiment shown in FIG. 3 is undertaken by the UA, i.e. a separate SPNA is not required. The UA seeks bids for a service direct from the various NPNAs, selects, for example, the primary and secondary interfaces, and instructs the NPNAs accordingly.

In some embodiments, all the networks may be radio-based, i.e. for wireless/mobile telecommunications. In other embodiments not all the networks may be radio-based as one or more is wire-lined.

In some embodiments, as regards the two possible sets of negotiation: inter-UA-SPNA and inter-SPNA-NPNA, one is implemented using a protocol such as the Contract Net Protocol whilst the other is implemented using an alternative protocol.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A telecommunications system comprising a plurality of networks at least one of which is a network for wireless telecommunications, each network comprising a network controller, the system also comprising a user controller, the user controller, in use, negotiating with the network controllers for provision of transport for a service to a user wherein the negotiation results in agreeing to contracts for transport of the service with at least two networks in respect to each of which the probability of providing transport is less than one, wherein the negotiations between the user controller and network controllers are via a service controller, the service controller being operative to negotiate with the network controllers for provision of transport of a service to the user, the user controller agreeing to contracts with both of a first network and a second network for shared transport of the service and having a first probability of providing transport, and agreeing to a contract for transport with a third network having a second probability of providing transport.

2. A telecommunications system according to claim 1, wherein the contract for transport with a third network is a contract for shared transport between the third network and the first network, second network or another network.

3. A method of transport provision for a service to a user, in a telecommunications system comprising a user controller and a plurality of networks at least one of which is a network for wireless telecommunications, each network comprising a network controller, the method comprising the user controller negotiating with the network controllers for provision of transport for the service leading to the user controller agreeing to contracts for transport of the service with at least two networks in respect of each of which the probability of transport is less than one, wherein the negotiations between the user controller and network controllers are via a service controller, the service controller being operative to negotiate with the network controllers for provision of transport of a service to the user, the user controller agreeing to contracts with both of a first network and a second network for shared transport of the service and having a first probability of providing transport, and agreeing to a contract for transport with a third network having a second probability of providing transport.

4. A method according to claim 3, wherein the contract for transport with a third network is a contract for shared transport between the third network and the first network, second network or another network.

5. A telecommunications system according to claim 1, wherein the user controller is a user agent and each network controller is a network provider negotiation agent, of a multi-agent distributed control software system.

6. A telecommunications system according to claim 1, wherein the negotiations between the user controller and network controllers are via a service controller, the service controller being operative to negotiate with the network controllers as to transport provision to the user of the service.

7. A telecommunications system according to claim 6, wherein the user controller is a user agent, each network controller is a network provider negotiation agent, and each service controller is a service provider negotiation agent, of a multi-agent distributed control software system.

8. A telecommunications system according to claim 7, wherein the multi-agent distributed control software system is in accordance with Contract Net Protocol.

9. A telecommunications system according to claim 1, wherein the user controller in use agrees to contracts for transport with both a first network having a higher probability of providing transport and a second network having a lesser probability of providing transport.

10. A telecommunications system according to claim 9, wherein the first network is used initially to transport the service to the user, intersystem handover to the second network then being undertaken dependent upon a predetermined criterion.

11. A telecommunications system according to claim 1, wherein each network with which a contract for transport is agreed, in use, makes some radio resource reservation to accommodate said transport dependent upon the respective probability of the network providing transport.

12. A telecommunications system according to claim 1, in which at least one network controller considers user location and/or terminal capabilities in estimating the probability of that network providing transport.

13. A telecommunications system according to claim 1, wherein network controllers dictate with what probability their networks can provide the transport, and the user controller or a service controller selects at least two networks to contract with in consequence.

14. A telecommunications system according to claim 1, wherein the user controller negotiates with the network controllers for provision of transport for multiple simultaneous services to the user, the user controller agreeing to contracts for transport of the multiple services with at least two networks in respect to each of which the probability of providing transport of each service is less than one.

15. A telecommunications system according to claim 1, wherein the negotiations between the user controller and network controllers are via a service controller, the service controller being operative to negotiate on behalf of a set of users with the network controllers for provision of transport for services to the set of users, each user controller thereby agreeing to contracts for transport with at least two networks in respect to each of which the probability of providing transport for each service is less than one.

16. A telecommunication system according to claim 1, wherein at least two of the network controllers collaborate with each other in the negotiation.

17. A telecommunications system according to claim 1, wherein the negotiation is undertaken before or after transport of the service is started.

18. A telecommunications system according to claim 1, wherein at least one of the networks is a code division multiple access (CDMA) or wideband code division multiple access (W-CDMA) network for wireless telecommunications.

19. A method according to claim 3, wherein the user controller is a user agent and each network controller is a network provider negotiation agent, of a multi-agent distributed control software system.

20. A method according to claim 3, wherein the negotiations between the user controller and network controllers are via a service controller, the service controller negotiating with the network controllers as to transport provision to the user of the service.

21. A method according to claim 20, wherein the user controller is a user agent, each network controller is a network provider negotiation agent, and each service controller is a service provider negotiation agent, of a multi-agent distributed control software system.

22. A method according to claim 21, wherein the multi-agent distributed control software system is in accordance with Contract Net Protocol.

23. A method according to claim 3, wherein the user controller agreeing to contracts for transport with both a first network having a higher probability of providing transport and a second network having a lesser probability of providing transport.

24. A method according to claim 23, wherein the first network is used initially to transport the service to the user, intersystem handover to the second network then being undertaken dependent upon a predetermined criterion.

25. A method according to claim 3, wherein each network with which a contract for transport is agreed, in use, makes some radio resource reservation to accommodate said transport dependent upon the respective probability of the network providing transport.

26. A method according to claim 3, wherein at least one network controller considers user location and/or terminal capabilities in estimating the probability of that network providing transport.

27. A method according to claim 3, wherein network controllers dictate with what probability their networks can provide the transport, and the user controller or a service controller selects at least two networks to contract with in consequence.

28. A method according to claim 3, wherein the user controller negotiates with the network controllers for provision of transport for multiple services to the user, the user controller agreeing to contracts for transport of the multiple services with at least two networks in respect to each of which the probability of providing transport for each service is less than one.

29. A method according to claim 3, wherein the negotiations between the user controller and network controllers are via a service controller, the service controller being operative to negotiate with the network controllers for of transport for services to multiple users, each user controller thereby agreeing to contracts for transport with at least two networks in respect to each of which the probability of providing transport for each service is less than one.

30. A method according to claim 3, wherein at least two of network controllers collaborate with each other in the negotiation.

31. A method according to claim 3, wherein the negotiation is undertaken before or after transport of the service is started.

32. A method according to claim 3, wherein at least one of the networks is a code division multiple access or wideband code division multiple access network for wireless telecommunications.

* * * * *